United States Patent
Sun et al.

(10) Patent No.: US 6,501,740 B1
(45) Date of Patent: Dec. 31, 2002

(54) SYSTEM AND METHOD FOR TELECONFERENCING ON AN INTERNETWORK COMPRISING CONNECTION-ORIENTED AND CONNECTIONLESS NETWORKS

(75) Inventors: Chaochen J. Sun, Howell; Earle H. West, Morganville; Robert E. Reit, Union Beach, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/813,217

(22) Filed: Mar. 7, 1997

(51) Int. Cl.$^7$ .................................................. H04M 3/42
(52) U.S. Cl. .................................. 370/261; 379/202.01
(58) Field of Search ................................ 370/260–265, 370/352–356; 379/202, 203, 206, 202.01, 203.01, 204.01, 205.01, 206.01; 709/204, 205, 206, 207

(56) References Cited

U.S. PATENT DOCUMENTS

| | | | |
|---|---|---|---|
| 3,912,874 A | | 10/1975 | Botterell et al. |
| 4,796,293 A | * | 1/1989 | Blinken et al. ............ 379/202 |
| 4,953,159 A | * | 8/1990 | Hayden et al. ............ 370/265 |
| 5,127,001 A | * | 6/1992 | Steagall et al. ............ 370/267 |
| 5,212,726 A | * | 5/1993 | Dayner et al. ............ 379/202 |
| 5,359,598 A | * | 10/1994 | Steagall et al. ............ 370/359 |
| 5,373,549 A | * | 12/1994 | Bales et al. ............ 379/93.21 |
| 5,483,588 A | * | 1/1996 | Eaton et al. ............ 379/202 |
| 5,528,281 A | | 6/1996 | Grady et al. ............ 348/7 |
| 5,537,141 A | | 7/1996 | Harper et al. ............ 348/12 |
| 5,553,311 A | | 9/1996 | McLaughlin et al. ....... 395/884 |
| 5,559,875 A | * | 9/1996 | Bieselin et al. ............ 379/202 |
| 5,566,231 A | | 10/1996 | Sizer, II ............ 379/142 |
| 5,572,442 A | | 11/1996 | Schulhof et al. ............ 364/514 |
| 5,583,560 A | | 12/1996 | Florin et al. ............ 348/7 |
| 5,583,932 A | | 12/1996 | Schneider et al. .......... 379/399 |

(List continued on next page.)

FOREIGN PATENT DOCUMENTS

| | | |
|---|---|---|
| EP | 0 604 053 A1 | 6/1994 |
| EP | 0 696 124 A2 | 2/1996 |
| WO | WO 96/36159 | 11/1996 |
| WO | WO 97/28628 | 8/1997 |

OTHER PUBLICATIONS

E T Powner, A Odeh, Y Wang; ATM LAN/LAN Bridging Connectionless methods performance analyses; Telecommunications conference IEEE; 130–134, Mar. 1995.*

Primary Examiner—Chau Nguyen
Assistant Examiner—Jasper Kwoh

(57) ABSTRACT

A system and method for teleconferencing between conferees connected through a connectionless network and conferees connected through a connection-oriented network having a bridge. A call server connects to a bridge hosting a teleconference among connection-oriented conferees and joins the teleconference. The connection-oriented signal received by the call server is converted into a connectionless signal and sent to authorized, authenticated conferees connected through the connectionless network. The call server receives a connectionless signal from a conferee through the connectionless network, converts the signal to a connection-oriented signal and sends the connection-oriented signal to the bridge. Connectionless signals are stored in a database to be analyzed or sent to other conferees, such as those who were unavailable to join the teleconference as it occurred. The call server provides multimedia interfaces to conferees by which the conferees can monitor and join an ongoing teleconference, access a stored teleconference, or configure a new teleconference. The call server can also bridge teleconferences hosted on two or more bridges, expanding the audience for a given teleconference beyond the capacity of a single bridge.

19 Claims, 8 Drawing Sheets

U.S. PATENT DOCUMENTS

| | | | |
|---|---|---|---|
| 5,596,635 A | | 1/1997 | Rao |
| 5,604,737 A | * | 2/1997 | Iwami et al. ............... 370/352 |
| 5,619,555 A | * | 4/1997 | Fenton et al. ................. 379/67 |
| 5,623,605 A | * | 4/1997 | Keshav et al. ......... 395/200.17 |
| 5,838,682 A | * | 11/1998 | Dekelbaum et al. ........ 370/401 |
| 5,907,598 A | * | 5/1999 | Mandalia et al. ...... 379/100.01 |
| 5,973,724 A | * | 10/1999 | Riddle ......................... 348/15 |
| 5,995,608 A | * | 11/1999 | Detampel, Jr. et al. ..... 379/205 |
| 6,005,845 A | * | 12/1999 | Svennesson et al. ........ 370/260 |

* cited by examiner

SYSTEM AND METHOD FOR TELECONFERENCING ON AN INTERNETWORK COMPRISING CONNECTION-ORIENTED AND CONNECTIONLESS NETWORKS

FIELD OF THE INVENTION

The field of this invention is teleconferencing, and particularly teleconferencing using an internetwork comprising a connection-oriented and a connectionless network.

BACKGROUND OF THE INVENTION

Teleconferencing is carried out by certain known systems using a connection-oriented network or internetwork. An internetwork is defined as a set of networks that are directly or indirectly interconnected. The most prevalent example of a connection-oriented network is the Public Switched Telephone Network (PSTN). As shown in FIG. 1, teleconferences on the PSTN 11 are established in a known fashion in one embodiment by a PSTN teleconference bridge 12 that has been preconfigured to establish the teleconference, e.g., with certain participants 13, at a certain time, etc. In one embodiment, one of the participants 13 preconfigures the bridge 12. In another embodiment, a teleconference administrator 14 preconfigures the bridge 12. In one embodiment, the bridge 21 calls the predetermined participants 13 and authenticates them. In another embodiment, the participants 13 call the bridge 12 and authenticate themselves. An example of an authentication mechanism is the entry of a password using Dual Tone Multi Frequency (DTMF) signals at a prerecorded audio prompt from the bridge 12. The bridge 12 bridges the authenticated connections, enabling the participants 13 to communicate with each other. A teleconference over a connection-oriented network such as the PSTN offers high quality, low latency multimedia transmission and reliable connections. Multimedia is defined to be information of the form of at least one of the group of audio, text, video, animation and graphics. Latency is defined to be the delay between the time information is sent and time it is received. A connection-oriented teleconference connection can be disadvantageously expensive, and does not readily offer the caller a multimedia interface useful for controlling and monitoring the status of the teleconference that is easily accessed using any of a number of general purpose software packages implemented on a wide variety of hardware platforms and networks. A useful teleconferencing multimedia interface would provide information such as the availability of teleconferences for which a user is scheduled or free to join; information on the status of a teleconference (e.g., the identities of the participants, whether a participant's connection is presently active or has been dropped, etc.); and means for conveniently scheduling and establishing a teleconference.

Other known systems carry out teleconferences using a connectionless network. An example of a connectionless network is the Internet. As shown in FIG. 2, participants or users 21 establish TCP/IP connections with a teleconference server 22 through the Internet 23, are authenticated, and send digitized connectionless voice signals in packets to the server 22. The teleconference server 22 multiplexes the connectionless voice input signals from the participants 21 and sends the resulting multiplexed signal to the participants 21 through the Internet 23. The server 22 can be preconfigured to host a teleconference consisting of certain predetermined participants, at a scheduled time, etc. The server 22 can be preconfigured by participants 21, or by a third party such as a teleconference administrator 24. Multimedia teleconferences over the Internet are inexpensive and can be established and monitored using convenient multimedia interfaces presented to the participants 21 and/or a third party such as teleconference administrator 24. An example of such a multimedia interface presents graphical and textual information to the participant, augmented by audio, video and animation. However, multimedia teleconference connections can be disadvantageously unreliable, suffer from high latency, and have high data error rates.

Using known systems, connection-oriented conferees (conferees communicating over a connection-oriented network) may teleconference only with other connection-oriented conferees, and connectionless conferees (conferees communicating over a connectionless network) may teleconference only with other connectionless conferees. Connection-oriented conferees often need to teleconference with connectionless conferees, and vice versa. Known systems are unable to accommodate such a hybrid mix of conferees, and hence the two groups are unable to communicate together.

SUMMARY OF THE INVENTION

An apparatus is provided for teleconferencing on an internetwork that has a connection-oriented network connecting a caller to a bridge and a connectionless network connecting users. A call server is connected to both the connection-oriented network and the connectionless network. The call server receives connectionless input signals from users through the connectionless network, multiplexes the signals, and translates the multiplexed signal into a connection-oriented output signal. The output signal is sent to the bridge connected to the connection-oriented network, which shares the signal with connection-oriented users. The call server receives a connection oriented input signal from the bridge, translates the connection oriented signal into connectionless output signal, and sends the connectionless signal to the users on the connectionless network. Thus, both connectionless and connection-oriented conferees can advantageously participate in the same teleconference. The call server accepts connectionless teleconference identification data from users, as well as caller authentication data, and provides both to the bridge. The call server further advantageously monitors the status of connectionless users and the connection to the bridge, and provides control signals and information both to the bridge through means such as DTMF signals and to the users through multimedia interfaces.

DETAILED DESCRIPTION OF THE INVENTION

Figure 1:
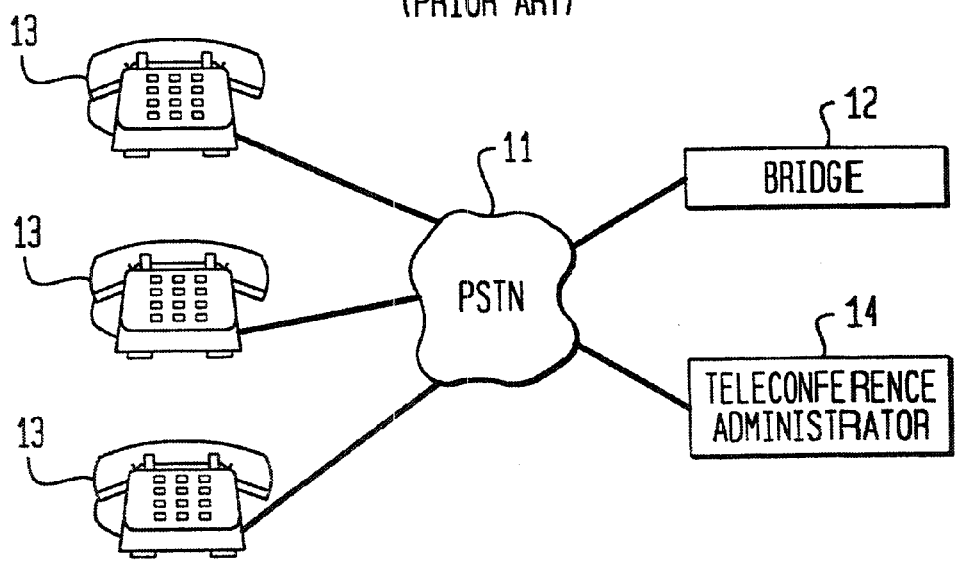
FIG. 1 shows an embodiment of a prior art connection-oriented teleconferencing system.
Figure 2:
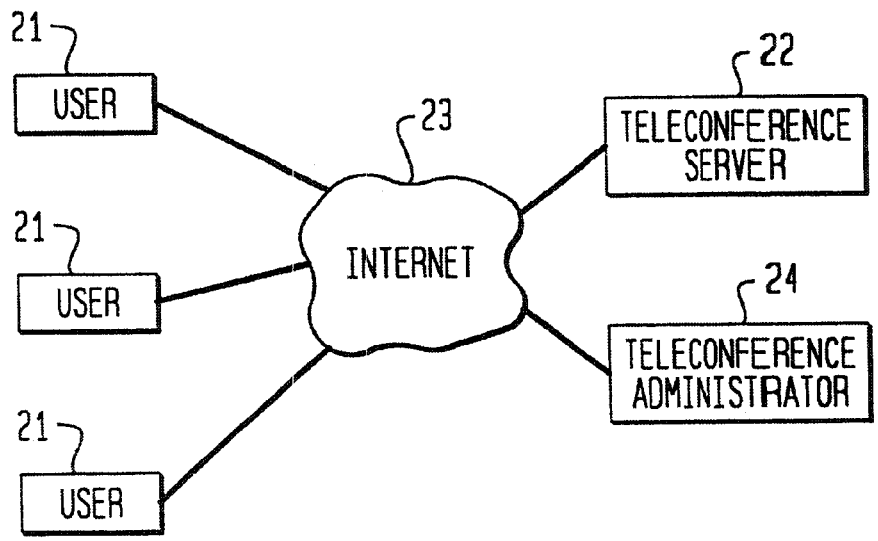
FIG. 2 shows an embodiment of a prior art connectionless teleconferencing system.
Figure 3:
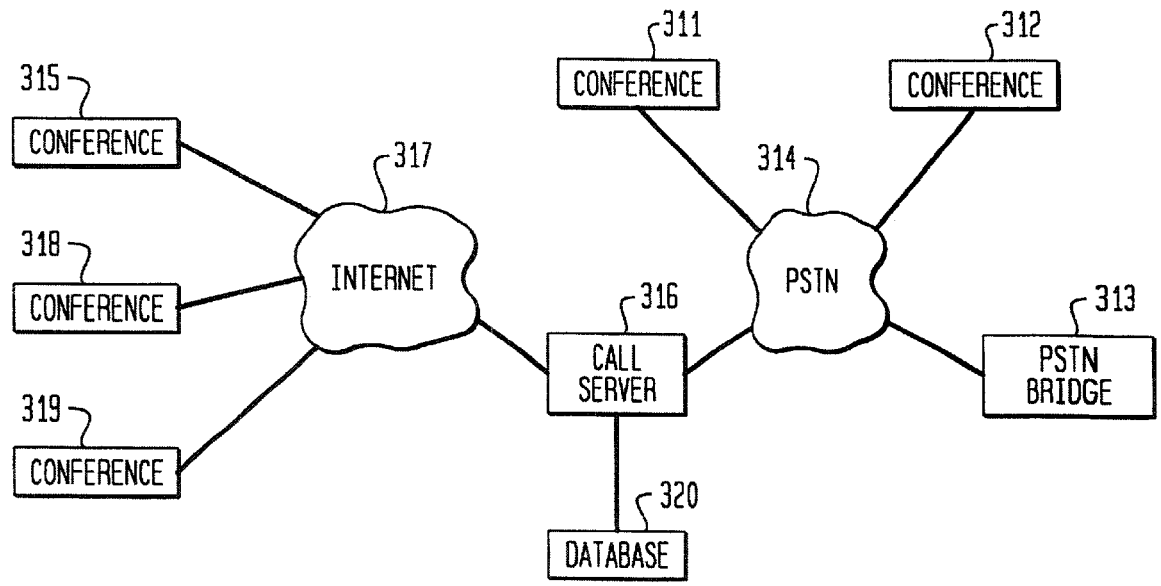
FIG. 3 shows an embodiment of the present invention.

An embodiment of the present invention is shown in FIG. 3. Conferees 311 and 312 connect to a PSTN conference bridge 313 through the connection-oriented PSTN 314. In this embodiment, conferee 312 earlier preconfigured the bridge to accept and/or establish calls for a named teleconference for a predetermined list of participants, each of whom would be authenticated by submitting a prearranged password using DTMF signals upon a recorded audio prompt from the bridge 313. Bridge 313 is also preconfigured to host other teleconferences, so that callers to the bridge must identify the named conference to which they intend to join. In this embodiment, the teleconference name is a three digit DTMF sequence that identifies the conference and serves to distinguish it from other conferences hosted on the same bridge 313. Conferees 311 and 312 communicate to the bridge 313, select the appropriate conference to join and authenticate themselves using DTMF signals in well known fashion.

In accordance with the present invention, Conferee 315 contacts call server 316 through the connectionless network 317, which in this embodiment is the Internet. Conferee 315 provides identity authentication data. In one embodiment, authentication is carried out by sending a user id and password from the conferee 315 over a secure connection through the network 317 to the server 316. The password and id are submitted through a multimedia user interface presented to conferee 315 by call server 316 at the conferee's 315 request. In one embodiment, this is carried out by sending a hypertext file from the call server 316 to the conferee's 315 computer, which displays the hypertext file to the conferee 315 using a browser.

Call server 316 then advantageously provides Conferee 315 multimedia information sent over the network 317 on the availability, scheduling and status of teleconferences available for Conferee 315 to join. In one embodiment, this information is provided to the conferee 315 as a hypertext file that can be advantageously displayed on a variety of known software programs known as browsers. Browsers are general purpose software programs that can be advantageously implemented across a wide range of hardware platforms.

Call server 316 collects data regarding teleconferences from connectionless conferees 315, 318 and 319 through multimedia interfaces, and from control signals sent from the bridge 313 to the call server 316. Teleconference data includes teleconference scheduling and configuration data, as well as the connection status and authentication data of individual participants or groups of participants. Teleconference data can be solicited from the bridge 313 by the call server 316 using DTMF signals sent from the call server 316 to the bridge 313.

In one embodiment of the present invention, conferee 315 teleconference data is presented to the connectionless conferee using a hypertext graphical user interface that includes hypertext links that the user can select to obtain information on the status of teleconferences, join and drop out of teleconferences. Conferee 315 selects a link to join the teleconference in which conferees 311 and 312 are participants. A message is sent to the call server 316, and the call server 316 then connects to the PSTN conference bridge 313 through the PSTN 314. The call server signals the bridge and provides sufficient information for the bridge to add conferee 315 to the teleconference joined by conferees 311 and 312, including teleconference identification information and conferee 315 identification and authentication data. Call server 316 is able to provide such data using DTMF signals, advantageously enabling call server 316 to interact with connectionless conferees such as conferee 315, and a conventional PSTN bridge 313. This is especially advantageous because it provides the means for connectionless conferees to participate in teleconferences involving a known PSTN bridge without requiring any special modifications to the known PSTN bridge. Call server 316 receives a connectionless input signal from conferee 315, which it converts to a connection-oriented output signal as is known in the art, and sends the converted signal to the bridge 313. Likewise, call server 136 receives a connection-oriented input signal from the bridge 313, and converts it to a connectionless output signal as is known in the art, and sends the it to conferee 315. Thus, connection-oriented conferees and connectionless conferees are able to communicate for the first time without requiring any changes in the existing PSTN bridge infrastructure. This is a cost efficient way to expand the potential audience for a connection-oriented teleconference, made possible by the novel configuration of the call server communicating over both connectionless and connection-oriented networks and converting connectionless signals to connection-oriented signals and vice versa in a coordinated fashion adapted for teleconferencing. The present invention further receives and sends teleconference data pertaining to the scheduling, status and control of teleconferences.

In one embodiment of the present invention, connectionless signals are converted to connection-oriented signals and vice versa using RealAudio Server software manufactured by the Progressive Networks company of Seattle, Wash.

Figure 3A:
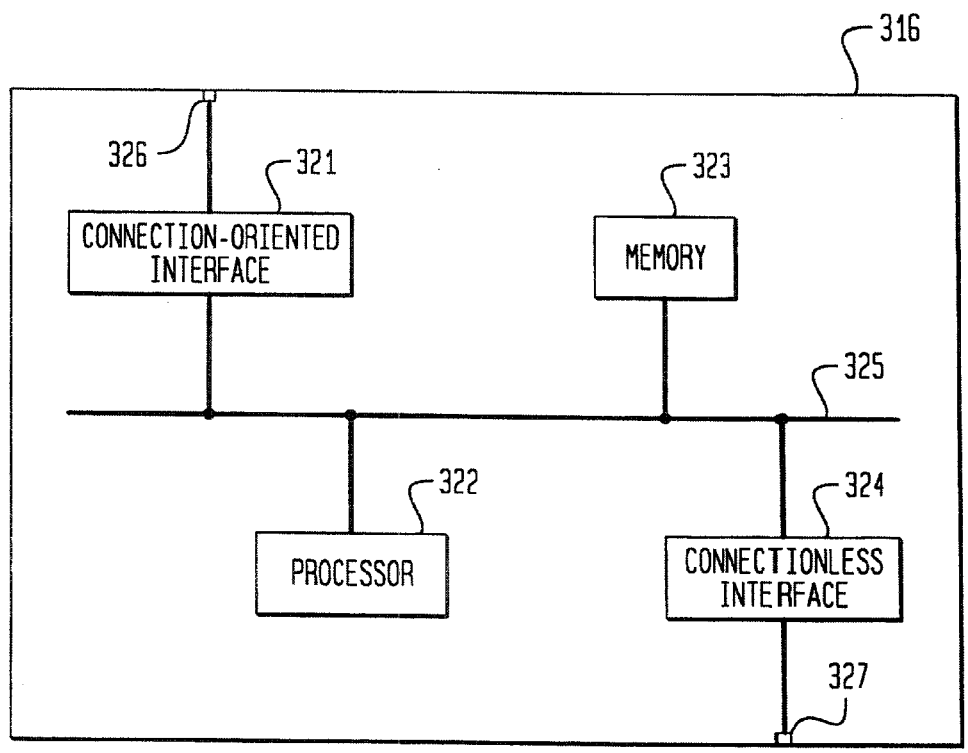
FIG. 3a shows an embodiment of the call server in accordance with the present invention.

An embodiment of call server 316 is shown in FIG. 3a. The call server 316 includes a connection-oriented interface 321, a processor 322, computer-readable memory 323, and a connectionless interface 324 interconnected by a data bus 325. Connection-oriented interface 321 is coupled to a connection-oriented network through a port 326, and connectionless interface is coupled to a connectionless network through a port 327.

One embodiment of the call server 316 uses a 16-bit Sound Blaster card manufactured by Creative Laboratories of California as the connection-oriented interface 321. A Pentium processor made by the Intel Corporation of California is the processor 322, operating in a HP Vectra XU6/200 computer manufactured by the Hewlett Packard company of California, which also provides the memory 323 and the data bus 325. In one embodiment, the call server 316 uses an Network Interface Card, Model No. HP J2 585A 10/100 VG PCI LAN adapter as the connectionless interface, manufactured by Hewlett Packard. In another embodiment, the call server 316 uses an US Robotics Sportster model 128K ISDN card as the connectionless interface. In yet another embodiment, the call server 316 uses a Comsphere 31 series CSU/DSU card made by the Paradyne Company as the connectionless interface 324. The call server in accordance with the present invention can be provided with several connectionless and connection-oriented interfaces. Further, the interfaces provided can be heterogeneous. For example, the call server can be provided with a LAN adapter interface and an ISDN interface and a CSU/DSU interface, as well as any other connectionless interface at the same time. Alternatively, the call server can be provided with a plurality of connectionless interfaces of the same type. Similarly, the call server can be provided with a series of connection-oriented interfaces, which may all be of the same type, or of different types.

Other connectionless conferees 318, 319 may join the conference in the same fashion as conferee 315. Call server 316 acts essentially as a proxy to the teleconference hosted by the PSTN bridge for connectionless conferees 315, 318 and 319. In this embodiment, connectionless input signals originating from conferees 315, 318 and 319 are sent to the call server. The call server 316 teleconferences connectionless conferees 315, 318 and 319 in known fashion. Call server 316 further converts the connectionless input signals to a connection-oriented output signal and sends it to the bridge 313, which treats the signal as if it were a single connection-oriented participant on a single input circuit, and bridges the signal with the rest of the circuits involved in the teleconference in known fashion.

Call server 316 also receives a connection-oriented input signal from the bridge that carries the inputs of the connection-oriented conferees 311 and 312, which have been combined by the bridge 313 in known fashion. Call server 316 converts the connection-oriented input signal to a connectionless output signal and sends the output signal to connectionless conferees 315, 318 and 319. Call server 316 thus advantageously allows connection-oriented conferees 311 and 312 and connectionless conferees 315, 318 and 319 to participate in a teleconference together.

The call server 316 in accordance with the present invention also sends and receives control signals from bridge 313 comprising teleconference data that includes the connection status of a conferee, conferee identification and authentication data, teleconference identification data, and teleconference configuration data. In one embodiment, call server 316 sends DTMF signals to bridge 313 requesting teleconference data, and bridge 313 sends DTMF signals to call server 316 in response. In another embodiment, bridge sends prerecorded connection-oriented multimedia prompts to call server 316, which converts the prompts to connectionless output signals and sends the signals to connectionless conferees. Connectionless responses to the prompts are received by the call server 316 and converted to connection-oriented signals, which the call server 316 sends to the bridge 313. In this way, connectionless conferees are able to advantageously provide teleconference data (including control data) to the bridge.

The connection-oriented and connectionless signals handled by the present invention can be mixed multimedia in nature. That is, whereas one conferee can be connected to the teleconference using a conventional telephone, another can be connected using a videoconferencing system, while yet another conferee may be connected with an electronic whiteboard. The present invention recognizes the mode by which each conferee is connected to the teleconference, and sends the appropriate signals to each conferee. For example, only the audio portion of a signal from a videoconference input is sent to a conferee connected by conventional telephone. Conferees may be connected using the present invention in other modes, including virtual reality animation, graphics, and text.

One embodiment of the present invention advantageously records all of the packetized content of the teleconference, storing it for later use in a database 320 connected to the call server 316. For example, in one embodiment, the recorded content is played by the call server to other parties who were unavailable at the time of the teleconference through either the PSTN, the Internet, or both. In another embodiment, the stored content is analyzed by a voice recognition system, and a version of the teleconference searchable by keyword is stored.

Figure 4:
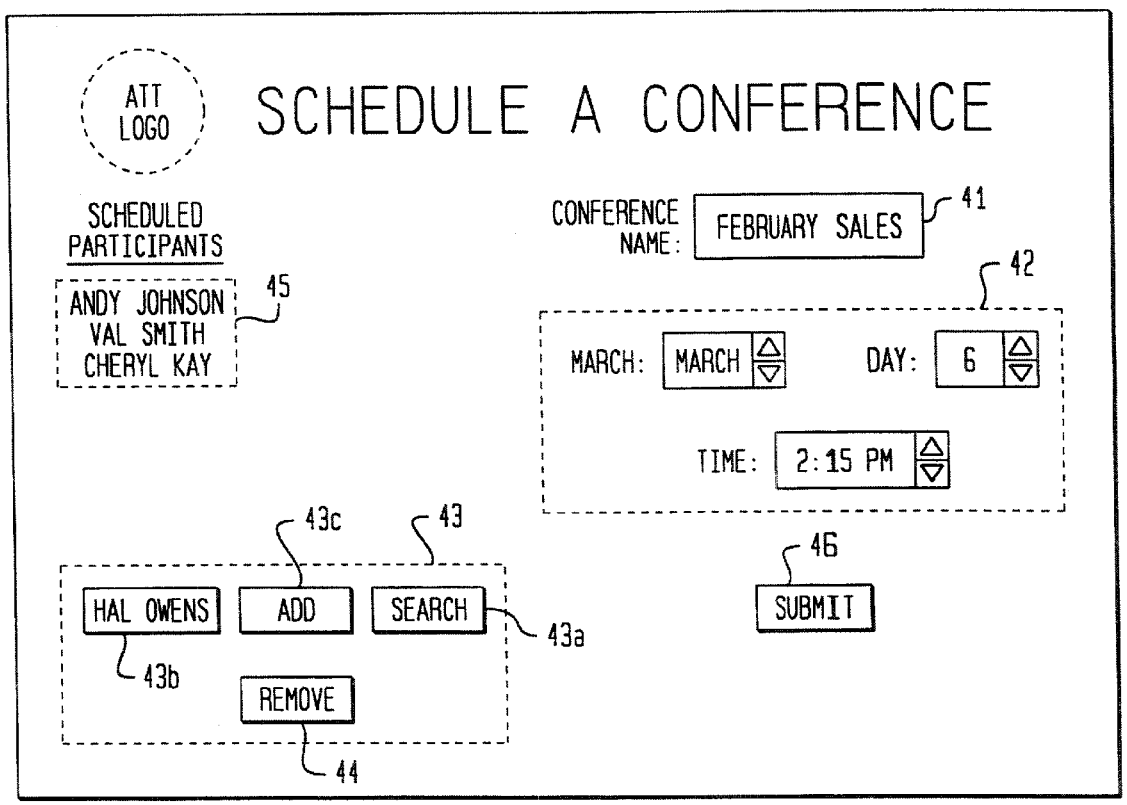
FIG. 4 shows an embodiment of graphical scheduling interface in accordance with the present invention.

The present invention enables either a connection-oriented or connectionless caller to provide teleconference data including schedule a teleconference in which both connection oriented and connectionless parties may participate. A caller can establish the date, time, and parties permitted to participate in a teleconference using DTMF signals over the PSTN to the PSTN bridge in known fashion. In one embodiment, a connectionless caller is provided with the means to specify sequences of DTMF signals to be generated by the call server to the PSTN bridge to preconfigure the bridge. This advantageously provides the connectionless caller with the ability to configure the PSTN bridge in the same fashion as a connection-oriented caller. In another embodiment, the connectionless caller is advantageously provided with multimedia user interfaces to access to the call server. In one embodiment, the multimedia interfaces are hypertext files provided to the user from the call server through the connectionless network. In this embodiment, the hypertext files are linked to Common Gateway Interface (CGI) software programs that carry out teleconferencing functions when selected. In another embodiment, teleconferencing functionality is carried out by JavaScript embedded in the multimedia user interfaces. One embodiment of a multimedia interface that is a graphical interface is shown in FIG. 4. A multimedia interface can include graphics, text, video, audio and animation components.

FIG. 4 shows a graphical interface suitable for scheduling a teleconference, including an input areas for naming 41, scheduling 42, and adding and removing 43 participants to and from a teleconference. Connection information for the participant (e.g., telephone number, network address, etc.) is stored in a searchable database connected to the call server. The initiator of the teleconference, by providing inputs to the graphical interface of FIG. 4, can add a participant by typing in the participant's name or nickname through the keyboard, or by carrying out a search using a keyword or portion of a keyword and selecting the search button 43a. A list of matches 43b is presented to the initiator, who then selects one or more participants from the list by highlighting them and selecting the add button 43c. A current list of selected participants 45 is displayed to the initiator, who can remove one or more participants by highlighting one or more names on the selected list and selecting the remove button 44. In one embodiment, the initiator also designates an authenticating password to be used by each scheduled participant in joining the teleconference (not shown). These passwords are distributed to the participants in one embodiment before the teleconference. In another embodiment, each participant is authenticated by the call server or the bridge, which requests the participant to provide a predetermined password when the participant first accesses the call server or the bridge.

As shown in FIG. 4, input area 42 are also provided by which a date and time can be selected for the teleconference. When the user is satisfied with the configuration (i.e., participants, date and time) of the scheduled teleconference, the submit button 46 is selected, and the configuration information is sent to the call server, which formulates teleconference access codes and sends them to the PSTN bridge. A teleconference is then established with the scheduled participants on the scheduled date at the scheduled time. Before the teleconference is initiated, the initiator or another authorized party can edit and change the configuration information. The configuration information is stored on the database connected to the call server.

In one embodiment of the present invention, the initiator can use predetermined address lists (listing groups of participants by a single designation) to specify the list of participants to whom the teleconference will be made available. These lists can be composed by the user, and are assigned a nickname later used to select the list. Other predetermined participant designators, such as "everyone," or *@marketing (* being a wildcard indicating any number of any characters, *@marketing indicating anyone in the marketing department) can also be provided. In another embodiment, the establishing user can specify the mode in which the teleconference is available to a specific participant, list of participants, or all participants. For example, the mode can be specified to be full duplex (full participation, speaking and listening) or half duplex (listen only). For example, a general broadcast to all members of a company may be specified as listen-only. An important meeting of principals in a business negotiation may be specified full duplex to the principals, and listen-only to certain others. An example of such a teleconference is the periodic teleconference held between the management of a company and equity analysts at brokerage houses. Such a teleconference can be specified full duplex between these parties, and listen only to any ordinary stockholder of the company. This feature of the present invention advantageously allows the establishing user of a teleconference to control participation in a way that efficiently facilitates the decision making process and dissemination of information, preventing a teleconference from becoming gridlocked with too many participants who can speak. Such gridlock is a common problem in known teleconferencing systems.

The present invention advantageously provides teleconference status information to conferees with access to the connectionless network for teleconferences for which the conferees have permission to access. An embodiment of the interface shown in FIG. 5 lists all of the teleconferences a conferee may join 51 and the status of each available teleconference 52. More detailed information regarding a particular teleconference is displayed to the user as another interface, an embodiment of which is shown in FIG. 6, when the user selects the name of the teleconference on the interface shown in FIG. 5 (e.g., by single-clicking on the name of the teleconference with a mouse). The user can join the teleconference either from the interface shown in FIG. 5 (e.g., by double-clicking the name of the teleconference) or from the interface shown in FIG. 6.

FIG. 6 shows the name of the teleconference 61, the participants 62 of the teleconference, as well as their connection equipment (connection oriented or connectionless) 63, connection mode (full or half duplex) 64, and connection status and historical data 65. A user wishing to join the teleconference selects the join button 66. The screen can be refreshed and updated by selecting the update button 67. In another embodiment, the update button is not necessary, as the present invention implements a program using JavaScript that automatically and periodically polls the call server to send updated teleconference status information.

Figure 5:
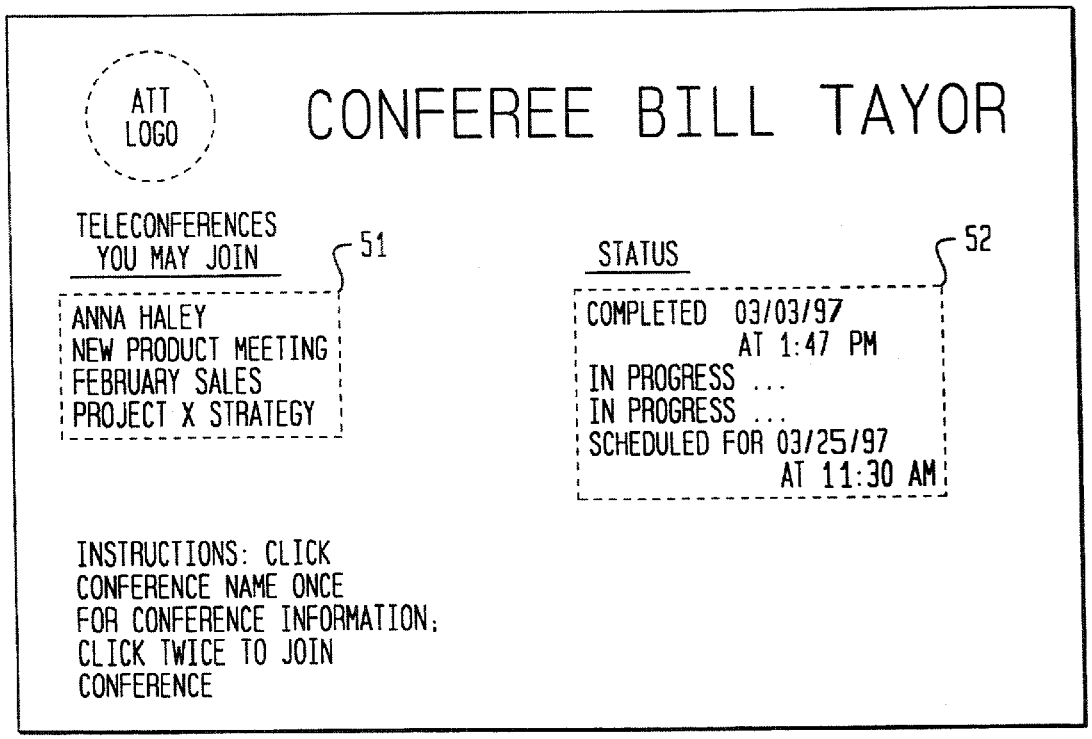
FIG. 5 shows an embodiment of graphical interface showing teleconferences available to join to a conferee.
Figure 6:
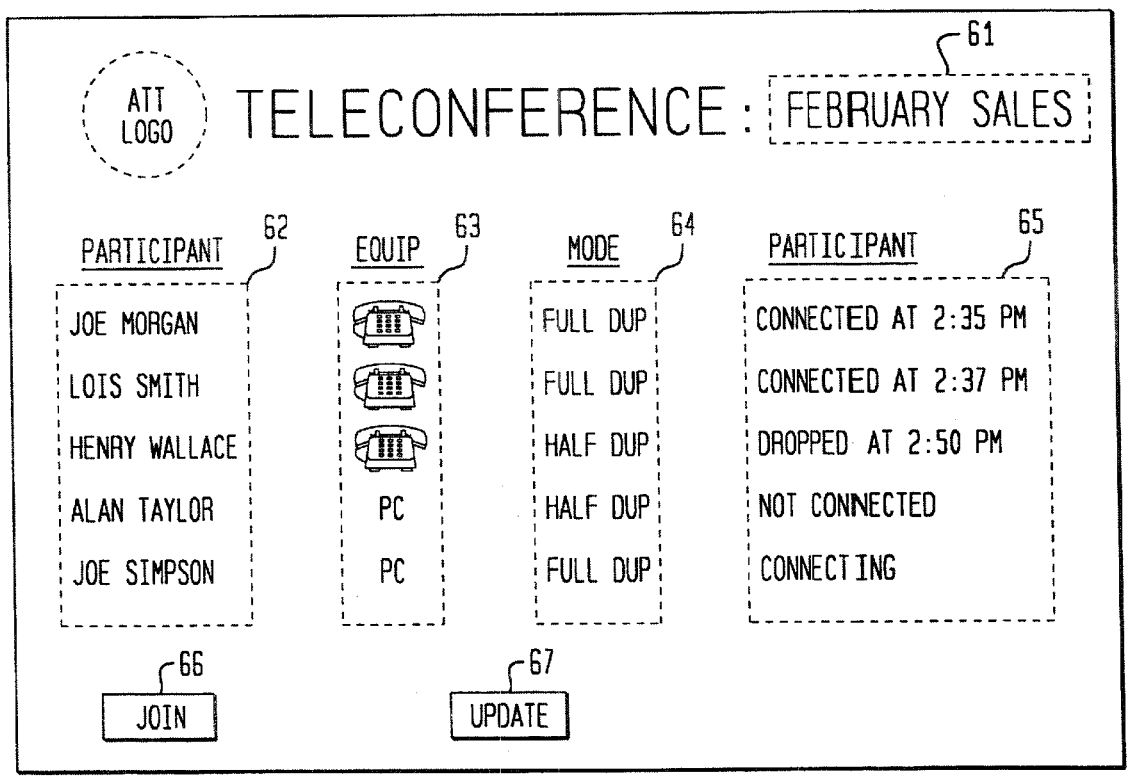
FIG. 6 shows an embodiment of a graphical interface showing teleconference data.

The graphical interfaces shown in FIGS. 4, 5 and 6 can be advantageously displayed in one embodiment on a wide variety of browsers that are executed on any suitable hardware platform. The present invention is also able to format, send and receive information to and from connectionless conferees using a wide variety of software packages to connect to the call server (e.g., audio software, videoconferencing software, electronic whiteboard software, etc.) implemented on a wide variety of hardware platforms, advantageously making the present invention available to the widest possible audience. The equipment that can be used by the connection-oriented conferees is constrained only by the limitations of the bridge. Any form of multimedia data can be exchanged between the call server in accordance with the present invention and a suitable bridge.

In an embodiment of the present invention where a teleconference has been scheduled using the call server, the call server sends the teleconference information to the PSTN bridge. The PSTN places the appropriate calls to PSTN participants, and sends status information and teleconference content to the audio server. Connectionless conferees are connected to the call server at the scheduled time. In one embodiment, the call server waits for connectionless conferees to connect through the connectionless network at their own initiative. In another embodiment, the call server contacts the conferees. This is carried out by a JavaScript program received by a conferee from the call server that executes on the conferee's computer and regularly polls the audio server to determine if a teleconference is initiating. If a scheduled teleconference is beginning, the JavaScript program causes the speaker on the conferee's computer to emit a sound (such as a ring or a beep) that alerts the conferee to the initiation of a teleconference of which he is a participant.

In another embodiment of the present invention, the teleconference is established manually in known fashion using DTMF signaling through a connection-oriented network. Connection-oriented participants are contacted in known fashion, and connectionless conferees are alerted using the JavaScript alerting program disclosed above.

As described in the above embodiments, the present invention can advantageously provide teleconferencing services using the connectionless network called the Internet, and the connection-oriented network known as the PSTN. However, the present invention can provide teleconferencing services on any connectionless network, including those that do not use the Internet Protocol, and on any connection-oriented network, such as a private switched telephone network (e.g., within a company or other organization) using any connection-oriented protocol (e.g., X.25). The content of the teleconference can be multimedia in nature, including at least one from the group of text, audio, video, animation, and graphics. Further, different conferees can participate with different combinations of multimedia signals.

Figure 7:
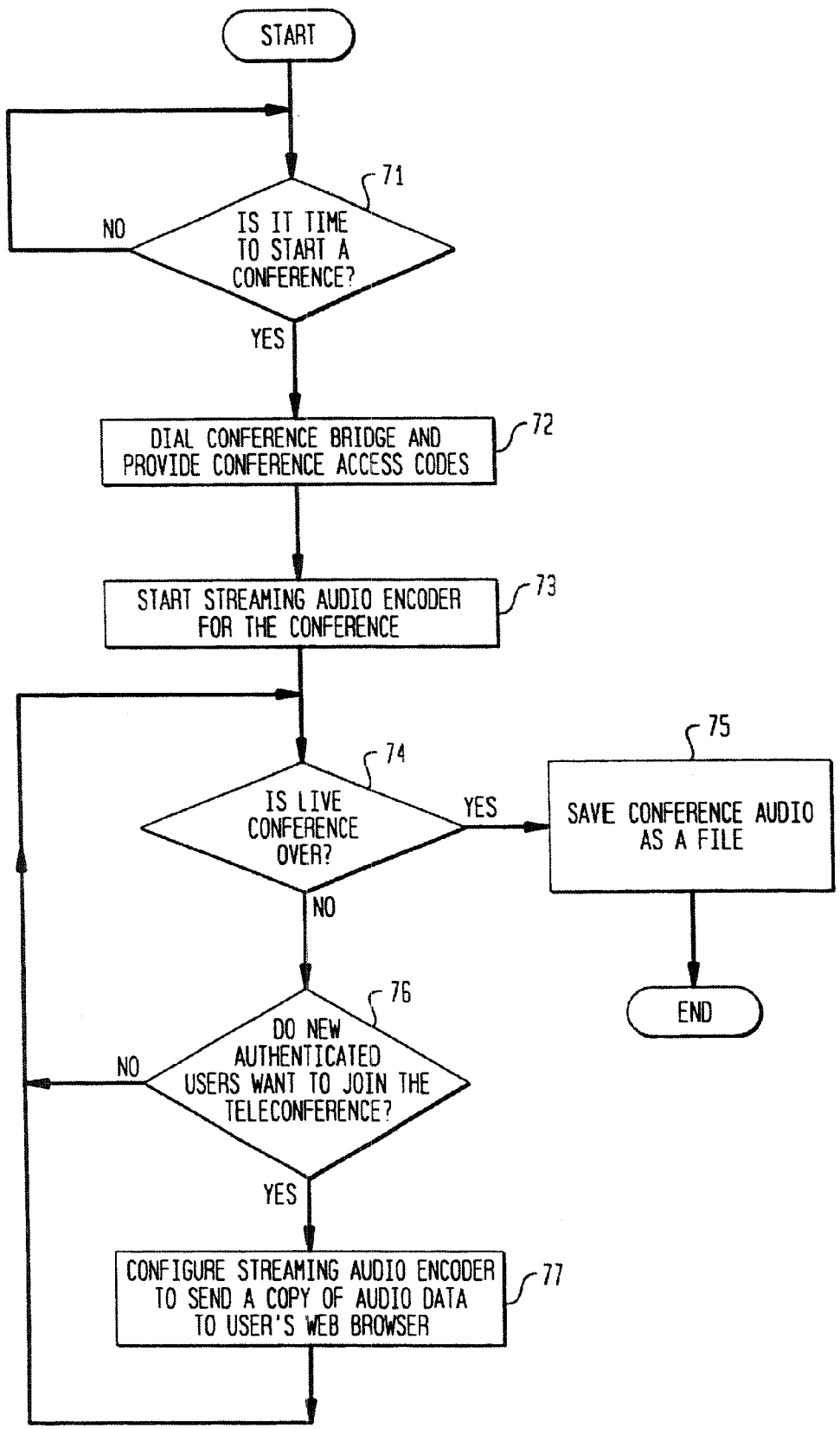
FIG. 7 shows an embodiment of the method for connecting the call server to a bridge in accordance with the present invention.

An embodiment of the method of establishing and managing a connection between the call server and the bridge in accordance with the present invention is shown in FIG. 7. The call server determines if a teleconference is scheduled to start at about the present time 71. If so, the call server establishes a connection to the bridge and sends teleconference data including access codes 72. The call server then converts connectionless signals to connection-oriented signals and vice versa as described above, and sends them to connectionless and connection-oriented conferees as appropriate 73. The call server monitors the connections between the call server and the bridge as well as the signals from the connectionless conferees to the call server to determine if the teleconference has terminated 74. If the teleconference is terminated, the contents of the teleconference are stored on a database 75. If the teleconference is not over, the call server monitors the connectionless conferees to determine if a new authorized conferee wishes to join the conference 76. If a new conferee is added, the call server sends the appropriate connectionless teleconference signals to the new conferee 77.

Figure 8:
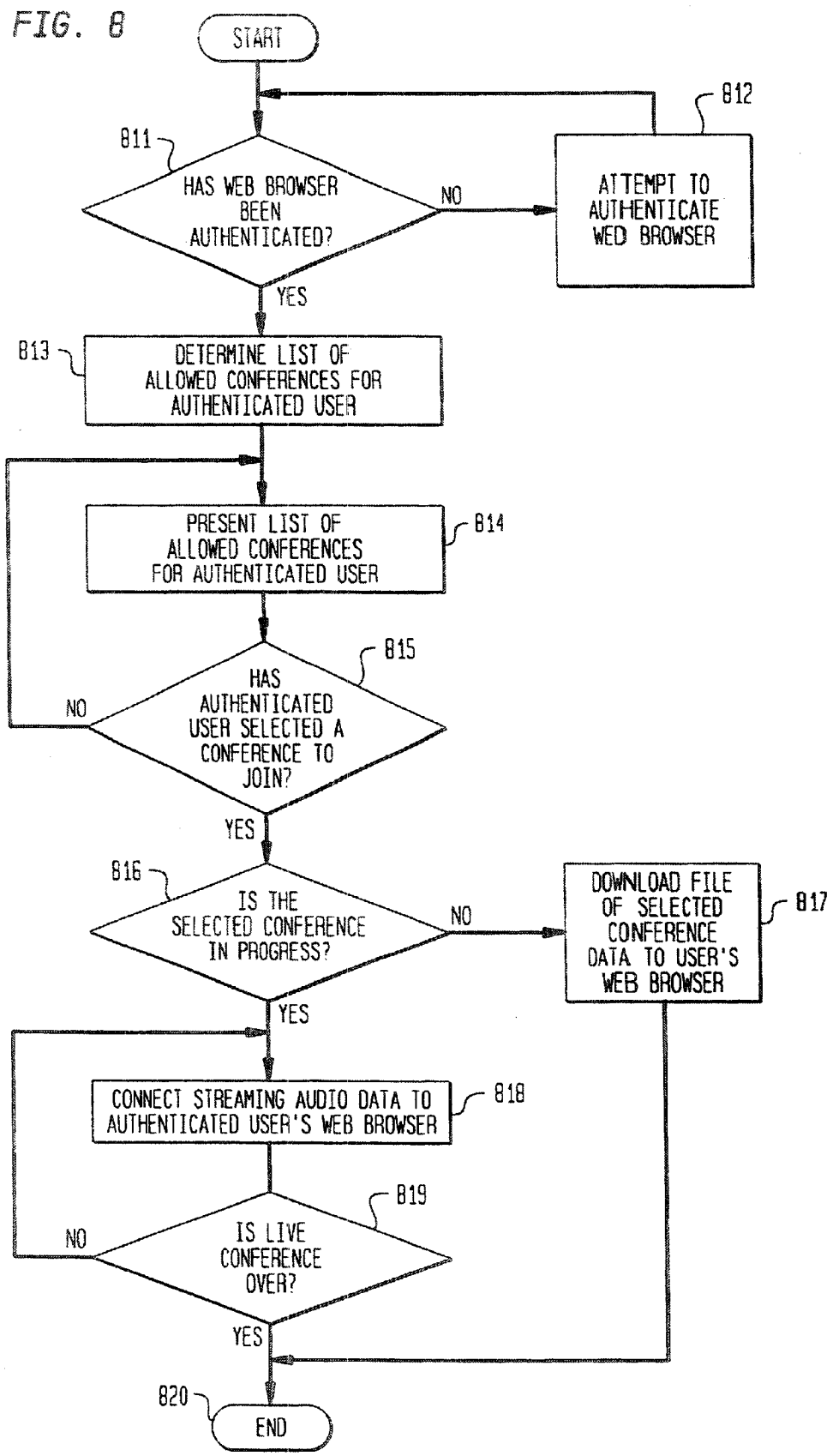
FIG. 8 shows an embodiment of the method for adding a connectionless conferee to a conference in accordance with the present invention.

An embodiment of the method of adding a new connectionless conferee to a teleconference in accordance with the present invention is shown in FIG. 8. The call server determines if the conferee has been authenticated through his browser 811. If not, the call server attempts to authenticate the conferee 812. Once the conferee has been authenticated, he call server determines which teleconferences the conferee is authorized to join 813. A list of such authorized conferences is presented to the conferee through his browser 814. The call server waits for the conferee to join a conference by selecting the conference from the list 815. Once the conferee has selected a conference, the call server determines if the conference is in progress 816. If the conference has already terminated, the call server downloads a file comprising the recorded teleconference to the conferee's computer 817, whereupon the conferee may analyze and play all or parts of the teleconference. If the selected teleconference is in progress, the call server sends and receives the appropriate connectionless signals to and from the conferee 818. When the conference is over 819, the call server ends the teleconference by disconnecting from the bridge 820.

Figure 9:
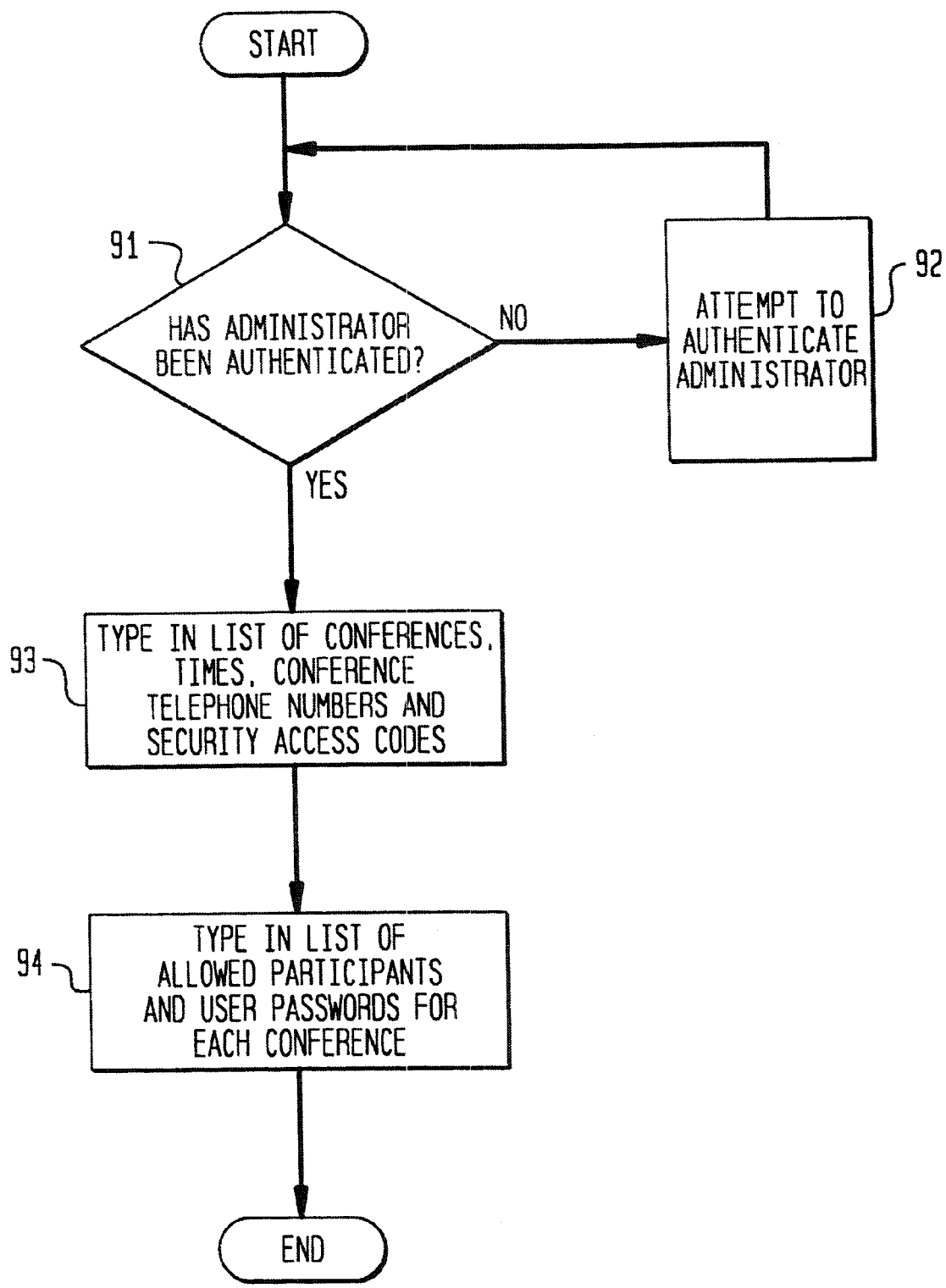
FIG. 9 shows an embodiment of the method for administering a new conference in accordance with the present invention.

An embodiment of the method by which a connectionless third party conference administrator configures a conference is shown in FIG. 9. The call server determines if the administrator is authenticated 91, and if she is not, the call server attempts to authenticate her 92. When the administrator has been authenticated, the administrator enters teleconference data including a list of conferences, scheduled dates and times, connection-oriented participant names and/or telephone numbers, and access codes to be used by the connection-oriented participants in joining the teleconference into a multimedia interface provided by the call server, and sends the teleconference data to the call server 93. The call administrator then enters the list of allowed connectionless participants and participant passwords that each participant can use to authenticate herself when joining a teleconference 94.

Yet another advantageous feature of the present invention is that it effectively expands the bridging capacity of a PSTN bridge, which can only bridge a certain finite number of calls when operated conventionally. Several connectionless conferees can be added to a teleconference such that the total number of conferees (connection-oriented plus connectionless) exceeds the finite capacity of the bridge, which is generally expressed in the maximum number of connection-oriented conferees whose signals it can bridge, assuming a single connection-oriented conferee per circuit connected to the bridge.

The present invention can further be advantageously used to expand the number of connection-oriented calls that can be bridged for a single teleconference beyond the capacity of any single bridge. This is achieved by the present invention by advantageously bridging connection-oriented teleconferences that exist on different PSTN bridges, essentially acting as a bridge to the PSTN bridges. In one embodiment, this is carried out by establishing a first connection from the call server to a first teleconference on a first bridge through the PSTN, and establishing a second connection to a second teleconference on a second bridge through the PSTN. The call server receives the first teleconference signal over the first connection and sends it to the second bridge over the second connection, and further receives the second teleconference signal over the second connection and sends it to the first bridge. In this fashion, the first and second teleconferences are bridged. This can be employed to advantageously merge multiple teleconferences hosted on a plurality of PSTN bridges into a larger teleconference with more participants than could be accommodated by any one PSTN bridge.

What is claimed is:

1. An apparatus for teleconferencing connection-oriented conferees connected to a connection-oriented network having a bridge and connectionless conferees connected to a connectionless network, comprising a call server having a processor and computer-readable memory, said call server provided with a first port to be coupled to connection-oriented network and a second port to be coupled to a connectionless network, said call server receiving a connectionless input signal from a connectionless conferee through the connectionless network, converting said connectionless input signal to a connection-oriented output signal and sending said connection-oriented output signal to the bridge, and receiving a connection-oriented input signal from the bridge, converting said connection-oriented signal input into a connectionless output signal, and sending said connectionless output signal to connectionless conferees through the connectionless network to conduct at least one teleconference.

2. The apparatus of claim 1, further comprising a database connected to said call server.

3. The apparatus of claim 1, wherein said call server sends multimedia teleconference data to a connectionless conferee.

4. The apparatus of claim 3, wherein said multimedia teleconference data includes list of teleconferences in which the connectionless conferee is authorized to participate and the status of each teleconference.

5. The apparatus of claim 3, wherein said multimedia teleconference data includes a list of participants in a teleconference and the status of each participant in the teleconference.

6. The apparatus of claim 3, wherein said multimedia teleconference data includes an input interface through which a conferee can enter or change teleconference data and send said data to said call server.

7. The apparatus of claim 6, wherein the conferee configures a new teleconference by entering and sending new teleconference data to the call server, said data including the name of the new teleconference, the names of at least two participants authorized to join the new teleconference, and a scheduled time and date for the new teleconference.

8. The apparatus of claim 3, wherein a conferee joins a teleconference by selecting a teleconference from a list of authorized teleconferences sent by said call server to the conferee and displayed to the conferee.

9. The apparatus of claim 1, wherein said call server authenticates the identity of a conferee.

10. A method for teleconferencing between connectionless conferees connected through a connectionless network and connection-oriented conferees connected through a connection-oriented network having a bridge, comprising the steps of:

a. establishing a connection from a call server to the bridge that is connected to a connection-oriented conferee through the connection-oriented network;

b. sending a teleconference data signal from the call server to the bridge;

c. converting a connectionless input signal received from an authenticated connectionless conferee to a connection-oriented output signal;

d. sending the connection-oriented output signal from the call server to the bridge;

e. receiving a connection-oriented input signal at the call server from the bridge;

f. converting the connection-oriented input signal to a connectionless output signal; and g. sending connectionless output signal from the call server to the authenticated connectionless conferee.

11. The method of claim 10, wherein said connection-oriented teleconference data signal of step b includes access codes needed to join a teleconference hosted by the bridge.

12. The method of claim 10, wherein said connectionless input and output signals are stored in a database.

13. The method of claim 12, further comprising the step of sending said connectionless input and output signals stored on said database to a conferee.

14. The method of claim 10, further comprising the step of providing a multimedia interface to a connectionless conferee.

15. The method of claim 14, wherein said multimedia interface identifies teleconferences which the conferee is authorized to join and the status of each authorized teleconference.

16. The method of claim 14, wherein said multimedia interface is used by the conferee to configure a new teleconference by entering the names of a at least two conferees authorized to participate in the new teleconference through the interface, and further comprising the step of receiving said names entered through the interface.

17. The method of claim 16, wherein the conferee further configures a new teleconference by entering a scheduled date and time at which the conferees are authorized to join said new teleconference.

18. The method of claim 10, further comprising the steps of monitoring the status of the teleconference, sending teleconference status information to connectionless conferees using a multimedia interface, and recording historical teleconference data in a database.

19. A system for teleconferencing between connectionless conferees connected through a connectionless network and connection-oriented conferees connected through a connection-oriented network having a bridge, comprising:

a. a call server having a processor and computer-readable memory that converts a connectionless input signal to a connection-oriented output signal and a connection-oriented input signal to a connectionless output signal;

b. a database that stores connectionless input and output signals;

c. means for identifying and authenticating a conferee;

d. means for joining a teleconference hosted by a bridge;

e. means for monitoring the status of a teleconference and providing teleconference status information to a conferee;

f. means for receiving teleconference configuration data.

* * * * *